United States Patent [19]

Ordonez Olmos

[11] Patent Number: 4,674,012
[45] Date of Patent: Jun. 16, 1987

[54] DEVICE FOR FIXING AND ADJUSTING THE OPTICAL BLOCK OF A LAMP ON A MOTOR VEHICLE

[75] Inventor: Jose M. Ordonez Olmos, Mzrtos, Spain

[73] Assignee: Cibie Projecteurs, Bobigny, France

[21] Appl. No.: 826,124

[22] Filed: Feb. 4, 1986

[30] Foreign Application Priority Data

Feb. 8, 1985 [FR] France .............................. 85 01805

[51] Int. Cl.$^4$ .............................................. B60Q 1/04
[52] U.S. Cl. ..................................... 362/61; 362/329; 362/396; 292/256.61
[58] Field of Search .......................... 292/253, 256.61; 362/61, 80, 396, 66, 310, 329

[56] References Cited

U.S. PATENT DOCUMENTS 2,499,555  3/1950  Wronkowski ........................ 362/61
3,836,763  9/1974  Hoffman et al. .

FOREIGN PATENT DOCUMENTS 2332887  6/1977  France .
2029954  3/1980  United Kingdom ................. 362/61

Primary Examiner—Larry I. Schwartz

[57] ABSTRACT

A device for fixing and adjusting an optical block (1) on a motor vehicle, said optical block being of the type including a plurality of peripheral positioning tabs (4a, 4b, 4c), said device comprising a one-piece support (6) suitably shaped to co-operate with the peripheral edge of said optical block, said support being provided firstly with a plurality of mounting members (15, 16, 17) enabling said support to be adjustably fixed to a vehicle, and secondly with a plurality of clamping members (7, 8, 9) suitable for co-operating with said positioning tabs (4a, 4b, 4c) on said optical block in order to position said support and to hold said support relative to said optical block, the relative positions of said mounting members and said clamping members ensuring that said optical block is correctly positioned on said vehicle.

8 Claims, 2 Drawing Figures

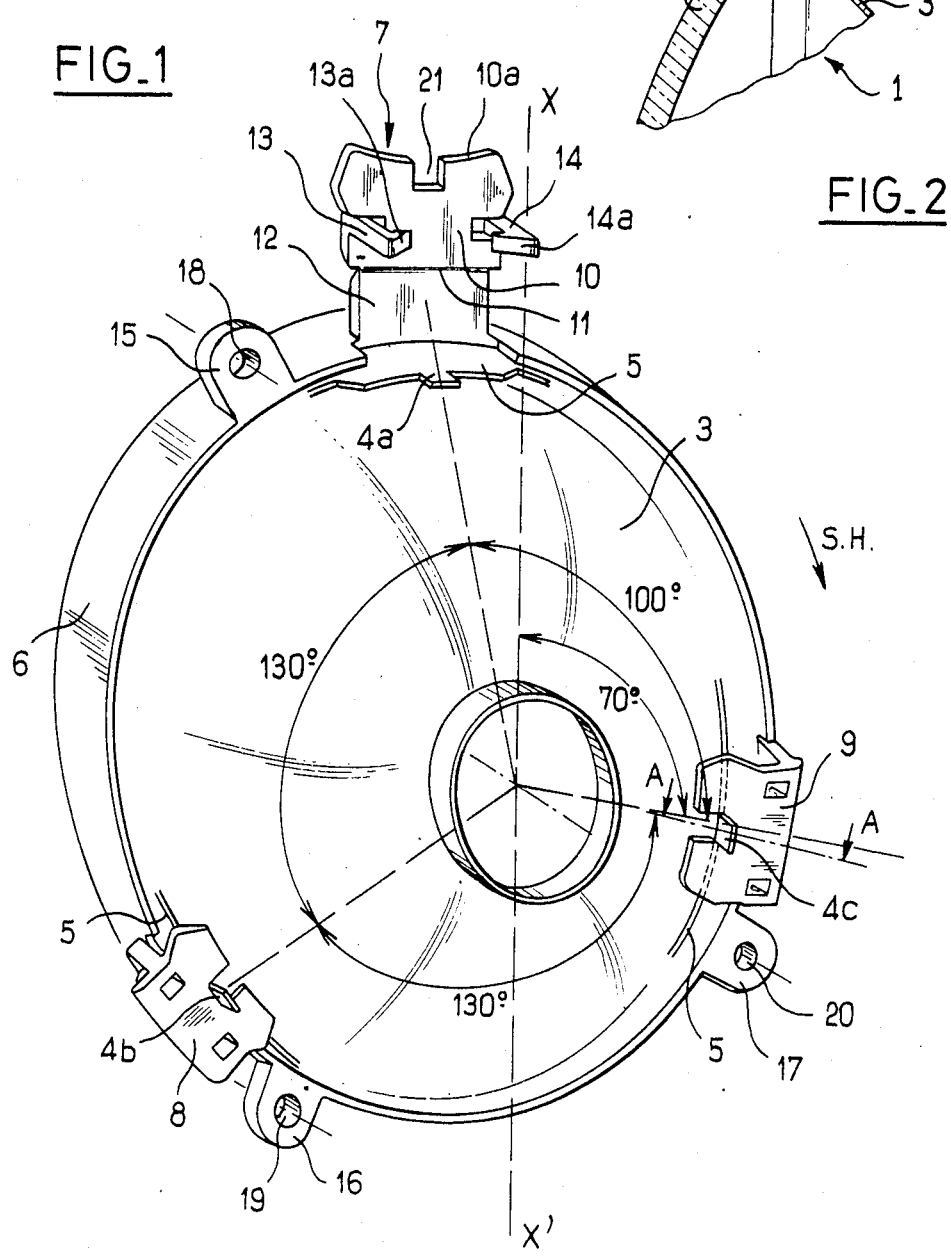
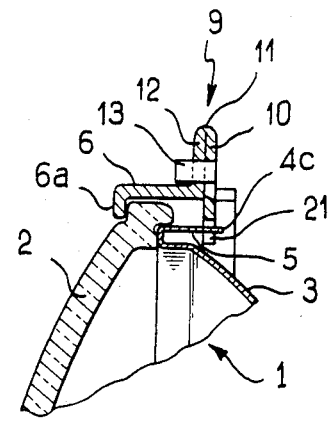

DEVICE FOR FIXING AND ADJUSTING THE OPTICAL BLOCK OF A LAMP ON A MOTOR VEHICLE

The present invention relates to adjustably mounting an optical block on a motor vehicle, said block being of the type which includes positioning tabs around its periphery.

BACKGROUND OF THE INVENTION

An optical block is an assembly comprising a source of light, a reflector, and a front glass. Such an assembly may either be capable of being disassembled, or else it may be sealed and incapable of being disassembled (American standards). To mount such a block on a motor vehicle and pointing in a suitable direction, it is conventional to provide the optical block with positioning tabs, and in particular with orientation tabs.

The constitution of one such optical block is, for example, defined in U.S. standard SAE J 571. This standard is entitled "Dimensional Specifications for Sealed Beam Headlamp Unit" and provides definitions both for round optical blocks and for rectangular optical blocks, and in particular it defines mounting positions together with means for obtaining correct positioning of the block relative to the vehicle.

For example, a seven inch round optical block has three positioning tabs disposed around its periphery, extending parallel to its optical axis, and located at successive angles of 130°, 130°, and 100°, with one of the tabs being at 70° from the upper vertical axis of the lamp unit, and with all these specifications being defined by the standard to which reference is now made.

In more general terms, the present invention applies to any optical block having positioning tabs, regardless of whether the optical block is of the sealed type and therefore conforms exactly with said U.S. standards, or whether the optical block is of the European type in which only the external shape and the location of the positioning tabs are standardized, or else, more generally still, the optical block has positioning tabs or lugs somewhere around its periphery.

In order to mount such an optical block on a motor vehicle, proposals have already been made to use a rear shell constituted by an annular portion of a sphere having an open end (zone), the contour of the shell being approximately identical to that of the reflector of the optical block, being engaged therewith, and bearing thereagainst by means of a peripheral flange constituted by the rear part of the rim of the glass. The assembly is held together by means of a front retaining ring covering the front part of said glass rim and coming into contact with the flange of said shell. The front retaining ring and the rear shell are fixed to each other by means of screws. When the screws are tightened, the glass rim of the optical block is clamped between the front retaining ring and the rear shell.

In order to position the optical block correctly, the positioning tabs of the optical block are engaged in corresponding notches provided for this purpose in the shell.

For a full understanding of the above description, reference may be made to said U.S. standard SAE J 571 which defines the retaining ring and the mounting notches.

Finally, in order to adjustably fix the assembly constituted in this way on a motor vehicle, the shell is generally provided with fixing lugs which are integrally manufactured therewith.

It can be seen that such mounting makes use of two main parts, namely: the front retaining ring and the rear shell, together with a set of screws for interconnecting said two main parts. As a result the materials and labor costs are relatively high and it would be advantageous to be able to reduce them.

To this end, the present invention seeks to provide a device for fixing an optical block of the above-mentioned type and for adjusting its position, with the device being constituted by a one-piece support which is advantageously constituted by a plastic molding.

SUMMARY OF THE INVENTION

The present invention provides a device for fixing and adjusting an optical block on a motor vehicle, said optical block being of the type including a plurality of peripheral positioning tabs, said device comprising a one-piece support suitably shaped to co-operate with the peripheral edge of said optical block, said support being provided firstly with a plurality of mounting members enabling said support to be adjustably fixed to a vehicle, and secondly with a plurality of clamping members suitable for co-operating with said positioning tabs on said optical block in order to position said support and to hold said support relative to said optical block, the relative positions of said mounting members and said clamping members ensuring that said optical block is correctly positioned on said vehicle.

Advantageously, said one-piece support is provided with an inwardly directed radial flange for fitting over the front of the periphery of said optical block, while said clamping members are disposed to retain the rear of said optical block.

In accordance with an optional feature of the invention, said mounting members and said clamping members are integrally molded with said support.

In accordance with another optional feature of the invention, each of said clamping members is constituted by a tongue hinged about a hinge on an outwardly-directed radially-extending fixed portion of said one-piece support and constituting an extension thereof, each of said clamping members further including an orifice suitable for imprisoning a corresponding one of said positioning tabs during a clamping operation performed by rotating said clamping member through 180° about said hinge, fastening means being provided for resiliently fixing said clamping member to said fixed radially-extending portion of said one-piece support.

BRIEF DESCRIPTION OF THE DRAWING

An embodiment of the invention is described by way of example with reference to the accompanying drawing, in which:

FIG. 1 is a perspective view of the rear of an optical block provided with a fixing and adjusting device in accordance with the invention, said device being partially clamped to the block; and FIG. 2 is a section on a section plane AA of FIG. 1 through a portion of the optical block and the fixing and adjusting device.

MORE DETAILED DESCRIPTION

The fixing and adjusting device shown in the figures is intended to co-operate with an optical block 1 constituted by a diffusing glass 2, a reflector 3, and a source of light (not shown).

In the example given, the optical block 1 has three positioning tabs 4a, 4b, 4c, disposed around its periphery and directed along axes parallel to the optical axis of the headlamp and at successive angles of 130°, 130°, and 100°, with one of said tabs, namely the tab 4b being at 70° in a direction SH from a vertical axis XX'.

The three positioning tabs 4a, 4b, 4c are obtained either by being cut out from sheet metal including a base 5 which is welded around the metal reflector, or else by being integrally molded with a reflector made of glass or of plastic.

In accordance with the invention, the optical block 1 receives a one-piece support 6 around its periphery, said support being molded from plastic material. The support 6 has a radially inwardly directed flange 6a at its front end, which flange is suitable for engaging the front of the peripheral edge of the optical block 1, as can be seen clearly in FIG. 2.

The support 6 includes three integrally molded clamping members 7, 8, and 9 disposed around its periphery level with the positioning tabs 4a, 4b, 4c, for being clamped thereto during assembly.

Each of the clamping members 7, 8, and 9, is constituted by a tongue 10 which is hinged about a hinge 11 on an outwardly-directed radially-extending fixed portion 12 of the generally circumferential one-piece support 6.

Each hinged tongue 10 has an orifice 28 in its free edge 10a which is notch-shaped and of a suitable width for engaging the corresponding positioning tab so as to imprison the tab during the clamping operation which is performed by rotating the tongue 10 through 180° about the hinge 11 and then resiliently anchoring the tongue against the fixed radial portion 12 by fastening means provided for that purpose.

The means for fastening the clamping member are constituted by two side arms 13 and 14 which are approximately parallel and which are integrally molded with the hinged tongue 10 and which project perpendicularly therefrom. The free ends of said side arms 13 and 14 include hooks 13a and 14a which are directed towards one another so that during the clamping operation they are resiliently cammed outwardly past the fixed radial portion 12 of the one-piece support 6, after which they snap back resiliently towards each other in order to latch behind said radial piece 12.

While the clamping members 7, 8, and 9 are being closed, the free edges 10a of the tongues 10 press against the reflector 3 of the optical block on either side of the corresponding notches 21, thereby supporting the rear of the optical block. The optical block is thus held between the front flange 6a and the folded down and clamped tongues 10. Furthermore, co-operation between the positioning tabs 4a, 4b, and 4c on the optical block 1, and the notches 21 of the tongues 10 on the support 6 ensures that the optical block 1 is accurately positioned relative to the support 6.

Finally, the one-piece support 6 includes three adjustable mounting members integrally molded at different points about its periphery. These members are in the form of lugs 15, 16, and 17 having tapped holes 18, 19, and 20 passing therethrough and suitable for receiving fixing and adjusting screws (not shown) which also pass through the vehicle bodywork.

These lugs 18, 19, and 20 are angularly offset relative to the positioning tabs 4a, 4b, and 4c through an angle at the center which corresponds to the desired position for the headlamp on the vehicle.

It can be seen that the lugs 15, 16, and 17 accurately position the support 6 relative to the vehicle, and that since the block 1 is accurately positioned relative to the support 6, the optical block 1 is itself accurately positioned relative to the vehicle, with any adjustment that may be required of the direction in which the headlamp beam points being perfomed on the lugs 15, 16, and 17.

I claim:

1. A device for fixing and adjusting an optical block on a motor vehicle, said optical block being of the type including a plurality of peripheral positioning tabs, said device comprising a one-piece support suitably shaped to co-operate with the peripheral edge of said optical block, said support being provided firstly with a plurality of mounting members enabling said support to be adjustably fixed to a vehicle, and secondly with a plurality of clamping members suitable for co-operating with said positioning tabs on said optical block in order to position said support and to hold said support relative to said optical block, each of said clamping members having a tongue hinged about a hinge on an outwardly-directed radially-extending fixed portion of said one-piece support and constituting an extension thereof, and each of said clamping members further including an orifice suitable for imprisoning a corresponding one of said positioning tabs during a clamping operation performed by rotating said clamping member through 180° about said hinge, and fastening means for resiliently fixing said clamping members to said fixed radially extending portion of said one-piece support, the relative positions of said mounting members and said clamping members ensuring that said optical block is correctly positioned on said vehicle.

2. A device according to claim 1, wherein said one-piece support is provided with an inwardly directed radial flange for fitting over the front of the periphery of said optical block, while said clamping members are disposed to retain the rear of said optical block.

3. A device according to claim 1, wherein said mounting members and said clamping members are integrally molded with said support.

4. A device according to claim 1, wherein said fastening means are constituted on each clamping member by means of two approximately parallel side arms integrally molded with said hinged tongue and extending perpendicularly therefrom, said arms having latching means provided at the free ends thereof and directed towards each other in such a manner that during a clamping operation said latching means come into resilient latching engagement with the far side of said fixed radial portion of said one-piece support.

5. An assembly ready for mounting on a motor vehicle, said assembly comprising a support according to claim 1 together with an associated optical block, said assembly comprising said support means clamped to said optical block.

6. An assembly ready for mounting on a motor vehicle, said assembly comprising a support according to claim 2 together with an associated optical block, said assembly comprising said support means clamped to said optical block.

7. An assembly ready for mounting on a motor vehicle, said assembly comprising a support according to claim 3 together with an associated optical block, said assembly comprising said support means clamped to said optical block.

8. An assembly ready for mounting on a motor vehicle, said assembly comprising a support according to claim 4 together with an associated optical block, said assembly comprising said support means clamped to said optical block.

* * * * *